(12) United States Patent
Slagell

(10) Patent No.: US 11,629,785 B2
(45) Date of Patent: Apr. 18, 2023

(54) FIBER REINFORCED SEAL LIPS FOR INCREASED PRESSURE RESISTANCE

(71) Applicant: Parker-Hannifin Corporation, Cleveland, OH (US)

(72) Inventor: Jesse D. Slagell, Nacogdoches, TX (US)

(73) Assignee: Parker-Hannifin Corporation, Cleveland, OH (US)

( * ) Notice: Subject to any disclaimer, the term of this patent is extended or adjusted under 35 U.S.C. 154(b) by 96 days.

(21) Appl. No.: 16/806,554

(22) Filed: Mar. 2, 2020

(65) Prior Publication Data

US 2020/0340587 A1   Oct. 29, 2020

Related U.S. Application Data

(60) Provisional application No. 62/837,926, filed on Apr. 24, 2019.

(51) Int. Cl.
*F16J 15/32* (2016.01)
*F16J 15/3232* (2016.01)
*F16J 15/3212* (2016.01)
*F16J 15/3204* (2016.01)
*F16J 15/3284* (2016.01)

(52) U.S. Cl.
CPC ....... *F16J 15/3232* (2013.01); *F16J 15/3204* (2013.01); *F16J 15/3212* (2013.01); *F16J 15/3284* (2013.01)

(58) Field of Classification Search
CPC .. F16J 15/3232; F16J 15/3204; F16J 15/3212; F16J 15/3284
See application file for complete search history.

(56) References Cited

U.S. PATENT DOCUMENTS

| | | | | | |
|---|---|---|---|---|---|
| 1,969,797 | A | * | 8/1934 | Hubbard | F16J 15/3208 277/556 |
| 2,208,482 | A | * | 7/1940 | Victor | F16J 15/3212 277/575 |
| 2,398,376 | A | * | 4/1946 | Hillman | F16J 15/3216 277/577 |
| 3,841,723 | A | | 10/1974 | Kelso | |
| 4,141,563 | A | * | 2/1979 | Wu | F16J 15/3208 277/575 |

(Continued)

FOREIGN PATENT DOCUMENTS

| | | | | |
|---|---|---|---|---|
| DE | 102011011225 A1 | * | 9/2011 | ........... F16J 15/3216 |
| GB | 479743 | | 2/1938 | |

OTHER PUBLICATIONS

Parker-Hannifin Corporation; Rotary Seal Design Guide; Catalog EPS 5350/USA; Published Mar. 28, 2006.

*Primary Examiner* — Eugene G Byrd
*Assistant Examiner* — L. Susmitha Koneru
(74) *Attorney, Agent, or Firm* — Renner, Otto, Boisselle & Sklar, LLP

(57) ABSTRACT

A radial lip seal includes a sealing lip body having a contact point defining an inner diameter of the radial lip seal, and a heelstock body defining an outer diameter and having a supporting section arranged radially inwardly relative to the outer diameter and extending along a boundary of the sealing lip body toward the contact point. The heelstock body is formed of a heelstock material that is flexible, and the heelstock material is stiffer relative to a material of the sealing lip body.

19 Claims, 6 Drawing Sheets

(56) References Cited

U.S. PATENT DOCUMENTS

| | | | |
|---|---|---|---|
| 6,161,834 A | 12/2000 | Pollack | |
| 8,328,202 B2 * | 12/2012 | Foster | F16J 15/3236 |
| | | | 277/572 |
| 2005/0073109 A1 * | 4/2005 | Schwerdtfeger | F16J 15/3252 |
| | | | 277/549 |
| 2017/0089466 A1 * | 3/2017 | Thomas | F16J 15/3252 |
| 2019/0170254 A1 * | 6/2019 | Taslakian | F16J 15/166 |

* cited by examiner

FIBER REINFORCED SEAL LIPS FOR INCREASED PRESSURE RESISTANCE

RELATED APPLICATIONS

This application claims the benefit of U.S. Provisional Application No. 62/837,926 filed Apr. 24, 2019, which is hereby incorporated herein by reference in its entirety.

FIELD OF INVENTION

The present invention relates to seal elements, and more particularly, to dynamic rotary sealing elements.

BACKGROUND

Various rotating applications use shaft seals, and more particularly, radial lip seals. Radial lip seals may be suitable for use in sealing lube oil in crankshaft applications for gasoline and diesel engines that may be used in a wide range of operating conditions, from the tropics to the arctic, in submarines, oil tankers, spacecraft, windmills, steel mills, paper mills, refineries, farm tractors, appliances, and automobiles. For example, the lip seal may be suitable for use in automotive wheels, electric motors, pumps, gearboxes and large rolls used in steel and paper manufacturing. The lip seal is used to protect the bearing used to support the shaft. Retaining the bearing lubricant and keeping the lubricant clean improves the bearing life and increases the overall life of the rotary shaft system.

Many lip seals are generally configured to be pressure-resistant in low-pressure applications, such as those between 0 and 7 psi, but may not be able to withstand higher pressure applications, such as those between 8 and 30 psi. One prior method for providing a pressure-resistant lip seal for use at such higher pressures, sometimes referred to as "medium-pressure" applications, includes using a metal component or shell that extends as a support for the sealing lip. However, adding metal material to the seal reduces the flexibility of the sealing lip, which is often needed to handle eccentricities in the shaft movement. Another prior method includes the use of an external backing element, such as an engineered plastic or other similar material, to provide support for the sealing lip. These elements may become lost or damaged during transit or installation, rendering them ineffective.

SUMMARY OF INVENTION

The present invention provides a radial lip seal that is suitable for use with a rotary shaft that is operable in a medium-pressure application, such as those between 8 and 30 psi. The radial lip seal advantageously uses a flexible heelstock body to at least partially surround and support a sealing lip body. The heelstock body is formed of a non-metal material that is stiffer as compared with an elastomeric material of the sealing lip body, such that a proper amount of stiffness is retained for bore retention of the radial lip seal, and over flexing of the radial lip seal is prevented. Using the flexible heelstock body is advantageous in that some flexibility of the seal is maintained as compared with conventional lip seals that have a metal shell which does not enable flexibility. Moreover, using the metal shell is more suitable for higher pressure applications, such as 100 psi or 1000 psi, whereas using the flexible heelstock body is more suitable for a medium-pressure application.

The sealing lip body has a lip or contact point that defines the inner diameter of the radial lip seal, and the heelstock body at least partially defines the outer diameter of the seal. The heelstock body is bonded to the sealing lip body and has a supporting section that is arranged radially inwardly relative to the outer diameter and extends along the sealing lip body toward the contact point. In exemplary embodiments, the heelstock body may be a continuous body such that the supporting section extends from the outer diameter to a heel point of the seal, and from the heel point toward the contact point. The heelstock body surrounds a midsection and flexible section of the sealing lip body, and terminates before reaching the contact point of the sealing lip body. In other exemplary embodiments, the supporting section may be arranged radially inwardly and separate from a main portion of the heelstock body such that each portion is separately bonded to the sealing lip body arranged between the heelstock portions.

In an exemplary embodiment, the heelstock body may surround most of the sealing lip body for supporting the sealing lip body. The sealing lip body may be continuous and formed of an elastomer material, such as fluoroelastomer, Nitrile, ethylene propylene diene terpolymer (EPDM), and the like. A suitable material for the heelstock body includes a fiber material and elastomer composite. Many different elastomer compounds may be used for the sealing lip depending on application requirements, and that many different fiber/elastomer combinations may be used for the heelstock material depending on application requirements.

According to an aspect of the invention, a radial lip seal comprising includes a sealing lip body having a contact point defining an inner diameter of the radial lip seal, and a heelstock body defining an outer diameter and having a supporting section that is arranged radially inwardly relative to the outer diameter and extends along a boundary of the sealing lip body toward the contact point. The heelstock body is formed of a heelstock material that is flexible, and the heelstock material is stiffer relative to a material of the sealing lip body. The heelstock material may be formed of a fiber material and elastomer composite.

According to another aspect of the invention, a method of forming a radial lip seal includes forming a sealing lip body having a contact point defining an inner diameter of the radial lip seal, forming a heelstock body defining an outer diameter and having a supporting section arranged radially inwardly relative to the outer diameter, forming the heelstock body of a heelstock material that is flexible and stiffer relative to a material of the sealing lip body, and bonding the heelstock body and the sealing lip body, wherein the heelstock body extends along a boundary of the sealing lip body toward the contact point.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

DETAILED DESCRIPTION

The present invention is directed toward a radial lip seal that is suitable for use in applications using a rotary shaft. Exemplary applications include sealing lube oil in crankshaft applications for gasoline and diesel engines that may be used in a wide range of operating conditions, from the tropics to the arctic, in submarines, oil tankers, spacecraft, windmills, steel mills, paper mills, refineries, farm tractors, appliances, and automobiles. The radial lip seal may be suitable for use in automotive wheels, electric motors, pumps, gearboxes and large rolls used in steel and paper manufacturing. In an exemplary embodiment, the radial lip seal is suitable for use in medium-pressure applications that typically range from 8-30 psi, as compared with low-pressure applications that are operable between 0 and 7 psi. Applications having pressure ranges up to 30 psi may be suitable. Many other applications may be suitable.

Figure 1A:
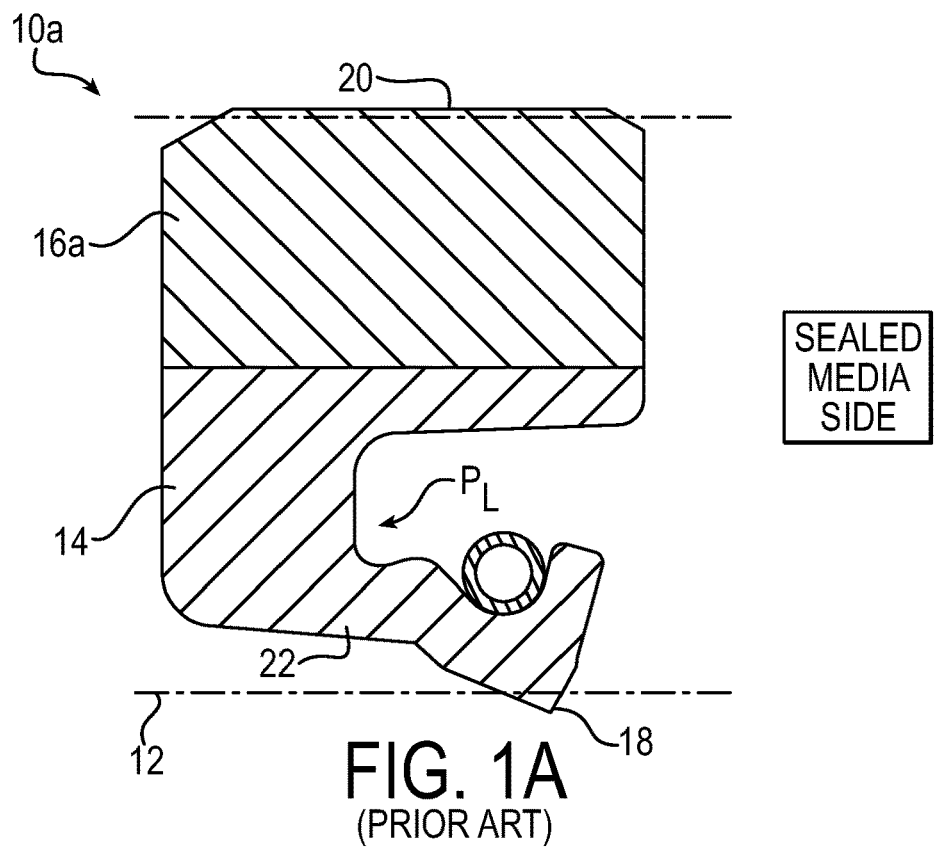
FIG. 1A is a drawing depicting a sectional view of a conventional radial lip seal.
Figure 1B:
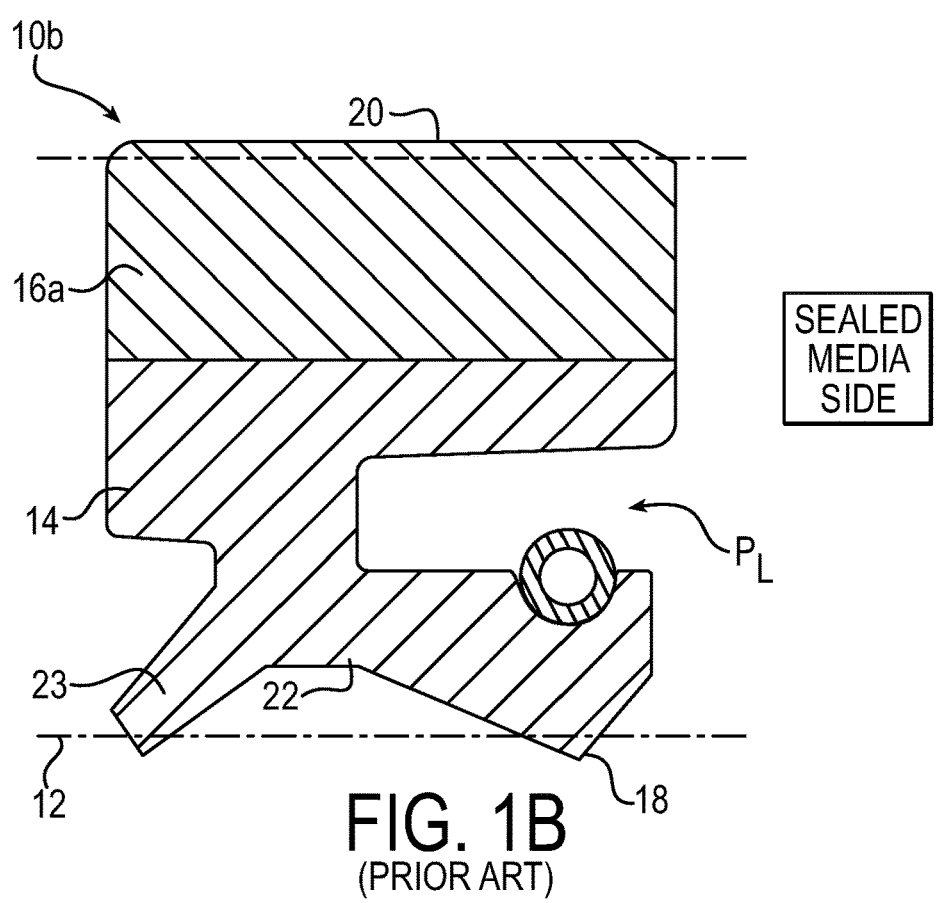
FIG. 1B is a drawing depicting a sectional view of another conventional radial lip seal.

FIGS. 1A-1D show conventional radial lip seals 10a, 10b, 10c, 10d that are arranged around a rotary shaft 12. As shown in FIGS. 1A and 1B, the radial lip seal 10a, 10b includes a sealing lip body 14 and a rigid body 16a. The sealing lip body 14 has a lip or contact point 18 which defines an inner diameter of the radial lip seal 10a, 10b, and the rigid body 16a defines an outer diameter 20. The sealing lip body 14 is open-faced toward a sealed media side of the radial lip seal 10a, 10b and is configured to receive a system pressure $P_L$, which may be a low-pressure of between 0 and 7 psi as is typical for conventional, non-reinforced lip seals. The sealing lip body 14 includes a flexible section 22 and may include a secondary excluder lip 23, as shown in FIG. 1B. The rigid body 16a is used to position and retain the sealing lip body 14. As aforementioned, the conventional radial lip seal 10a, 10b using the rigid body is disadvantageous in that the seal may not be suitable for use in higher pressure applications.

Figure 1C:
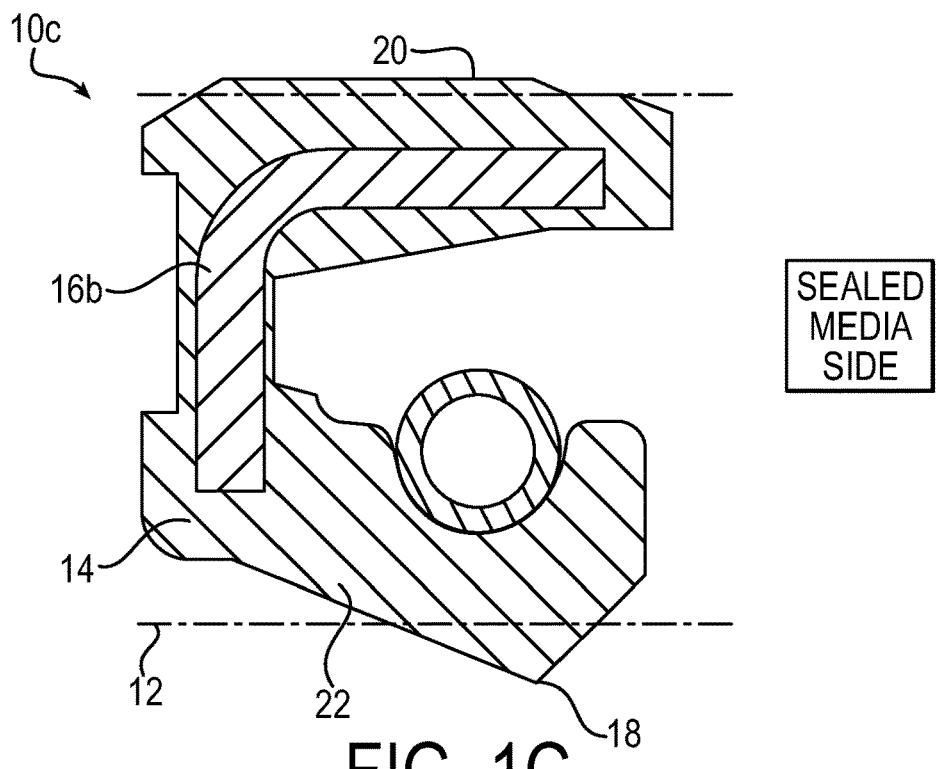
FIG. 1C is a drawing depicting a sectional view of another conventional radial lip seal.
Figure 1D:
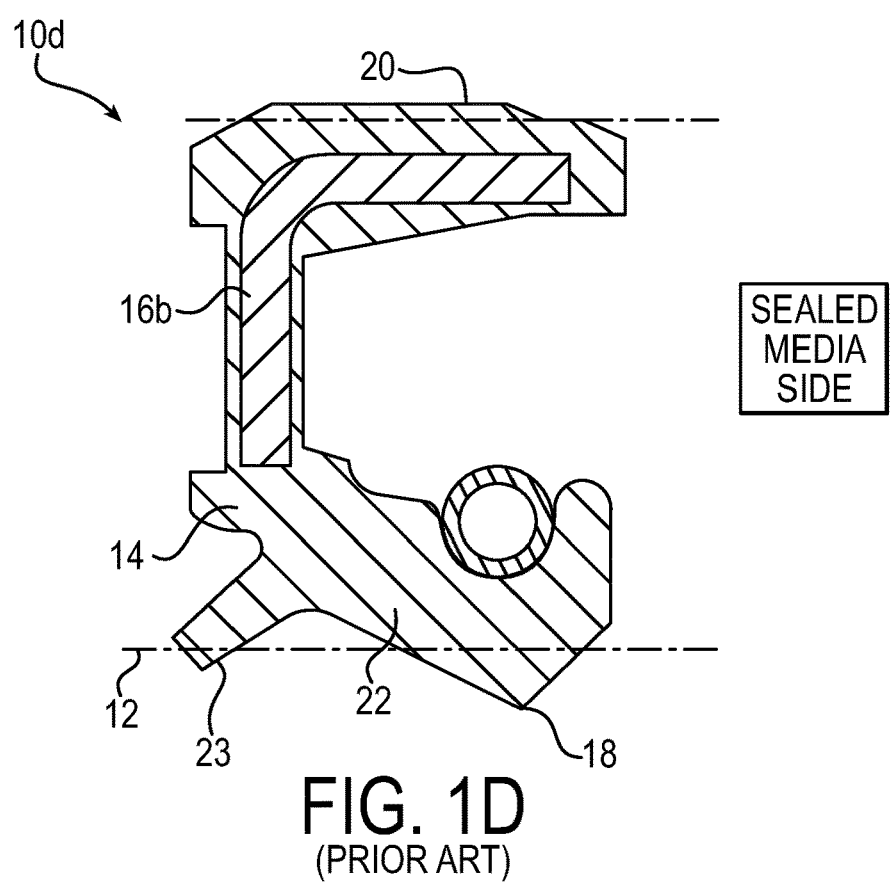
FIG. 1D is a drawing depicting a sectional view of another conventional radial lip seal.

FIGS. 1C and 1D show radial lip seals 10c, 10d having the sealing lip body 14 and the rigid body 16b, which is formed of a metal material. FIG. 1D shows the flexible section 22 of the sealing lip body 14 having the secondary excluder lip 23. Using the metal rigid body 16b is disadvantageous in that the metal rigid body 16b or shell provides bore retention but fails to provide pressure resistance. In other conventional seals, the metal rigid body 16b may extend into the flexible section 22 of the sealing lip body 14 to provide support to the sealing lip body 14 under increased pressure. Such a configuration of the metal rigid body 16b is disadvantageous in that flexibility of the sealing lip body 14 is reduced.

Figure 2:
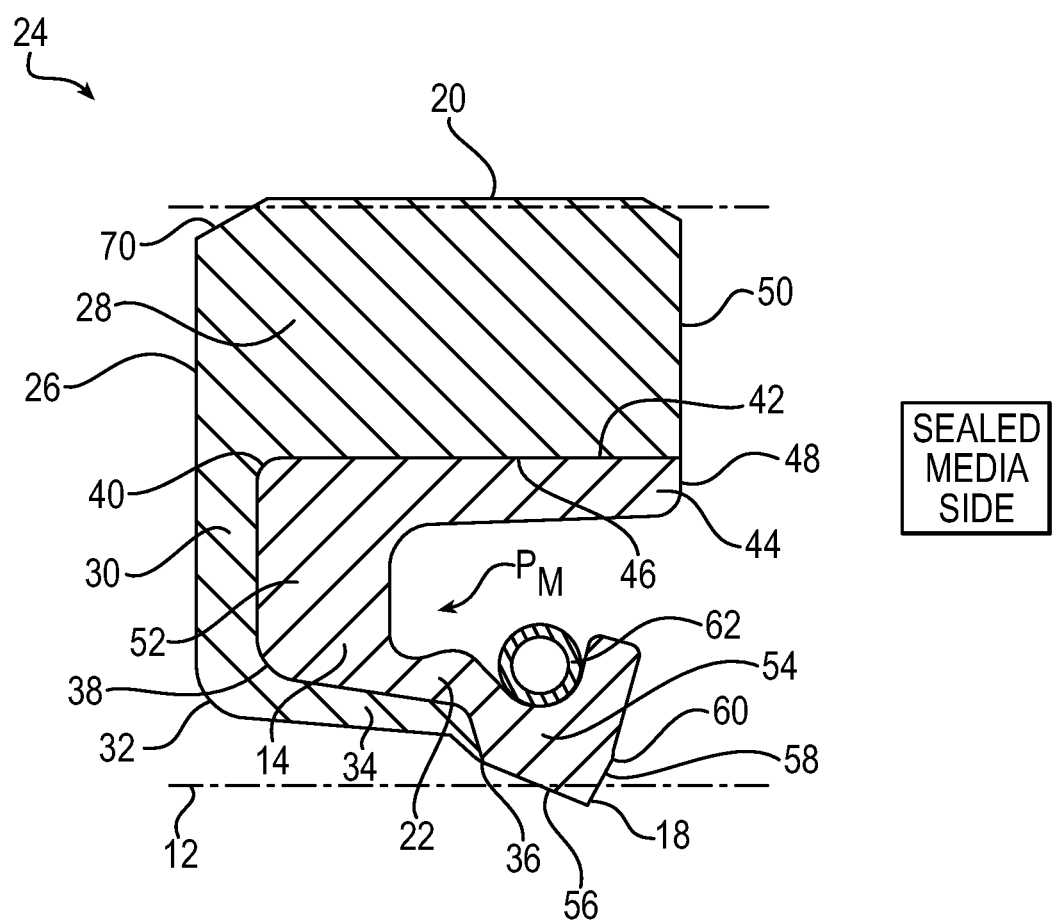
FIG. 2 is a drawing depicting a sectional view of a radial lip seal in accordance with an embodiment of the present application in which a heelstock body extends radially inwardly along a boundary of sealing lip body and axially toward a contact point of the sealing lip body.

FIG. 2 shows a radial lip seal 24 in accordance with an embodiment of the present application. The radial lip seal 24 is arranged around the rotary shaft 12 and has the sealing lip body 14, and a heelstock body 26 that is formed of a material that is flexible and stiffer as compared with the elastomeric material of the sealing lip body 14. The material is less stiff than a metal material. The sealing lip body 14 includes the contact point 18 which contacts the rotary shaft 12. The rotary shaft 12 may be operable in a wide range of speeds and have any suitable diameter. For example, the rotary shaft 12 may have speeds up to 30 m/s and diameters between 5 and 254 mm (between 0.2 and 10 inches), and beyond. The radial lip seal 24 may be suitable for use in very slow and nearly static applications.

In an exemplary embodiment, the material of the sealing lip body 14 may be formed of an elastomer material, such as fluoroelastomer, Nitrile, ethylene propylene diene terpolymer (EPDM), and the like, and a suitable material for the heelstock body 26 includes a fiber material and elastomer composite. Many different elastomer compounds may be used for the sealing lip depending on application requirements, and that many different fiber/elastomer combinations may be used for the heelstock material depending on application requirements. For example, any fluoroelastomer material may be particularly suitable for operating temperatures that range between −40 and 205 degrees Celsius (between −40 and 400 degrees Fahrenheit). In other exemplary applications, nitrile or polytetrafluoroethylene (PTFE) may also be suitable. In an exemplary embodiment, the sealing lip body 14 may be formed of a rubber material to which PTFE is bonded for enhanced performance.

The heelstock body 26 is formed to extend around the sealing lip body 14 such that the heelstock body 26 enables flexibility of the seal while also providing stiffness to the sealing lip body 14 for bore retention. The sealing lip body 14 is formed to be open-faced toward the sealed media side of the radial lip seal 24, and the heelstock body 26 defines a heel of the radial lip seal 24. Using the heelstock body 26 prevents over-flexing of the radial lip seal 24 when the seal is subject to higher pressure loads of around 8 to 30 psi, while still maintaining some flexibility of the sealing lip body 14. The heelstock body 26 may be formed of any suitable material and the material may be a non-metal material, in contrast to conventional reinforced radial lip seals. A fiber-reinforced composite material may be suitable. In an exemplary embodiment, a suitable material may be a fiber material and elastomer composite. For example, an aramid fiber and fluoroelastomer material may be particularly suitable for use with a fluoroelastomer sealing lip body 14.

The heelstock body 26 has a main body section 28 that defines the outer diameter 20 of the radial lip seal 24 and a supporting section 30 that extends from the main body section 28 to a heel point 32 of the heelstock body 26 that defines the heel of the radial lip seal 24. The heel point 32 may be curved such that the angle of curvature of the heel point 32 is greater than 90 degrees, i.e. the heel point 32 is not a sharp corner. The supporting section 30 may extend radially inwardly toward the inner diameter of the radial lip seal 24, as defined by the contact point 18 of the sealing lip body 14. A heel section 34 of the heelstock body 26 extends from the heel point 32 toward the contact point 18 such that at least two corners of the sealing lip body 14 are surrounded by the heelstock body 26. As the main body section 28 defines the radially outer end of the radial lip seal 24 and the supporting section 30 defines an axial end surface, the heelstock body 26 is formed to at least partially encompass or surround the flexible section 22 of the sealing lip body 14, in contrast to the rigid body 16 of the conventional radial lip seal 10 shown in FIG. 1. The main body section 28 and the heel section 34 extend axially toward the sealed media side of the radial lip seal 24 relative to the supporting section 30 such that the heelstock body 26 receives and retains the sealing lip body 14. In an exemplary embodiment, the heelstock body 26 is formed to surround more than half of a perimeter, or the outer boundary, of the sealing lip body 14.

The heelstock body 26 is in contacting engagement against the sealing lip body 14 and may be attached to the sealing lip body 14 by bonding or one-piece molding. Each of the heelstock body 26 and the sealing lip body 14 is formed as a continuous body or a single body. The heel section 34 of the heelstock body 26 extends axially along the flexible section 22 of the sealing lip body 14 toward the contact point 18 and terminates at a termination point 36 before it reaches the contact point 18. Accordingly, the contact point 18 of the sealing lip body 14 is maintained against the rotary shaft 12. In an exemplary embodiment, the heel section 34 may be axially sloped from a heel point 38 of the sealing lip body 14 toward the contact point 18. Surrounding the sealing lip body 14 with the heelstock body 26 is advantageous in that the sealing lip body 14 forms a pocket that is surrounded by the heelstock body 26 and is configured to receive a system pressure $P_M$, which may be a medium pressure between 8 and 30 psi.

The heelstock body 26 may curve around both the heel point 38 of the sealing lip body 14 and a radially outer end point 40 of the sealing lip body 14 that is radially spaced from the heel point 38. The main body section 28 of the heelstock body 26 has an inner diameter 42 opposing the outer diameter 20, and the inner diameter 42 may curve around the radially outer end point 40 to the supporting section 30. The supporting section 30 then extends radially inwardly toward the heel point 32 until the supporting section 30 curves around the heel point 38 of the sealing lip body 14 toward the heel section 34 of the heelstock body 26 and the sealed media side of the radial lip seal 24. In an exemplary embodiment, the axial length of the main body section 28 of the heelstock body 26 is greater than the axial length of the supporting section 30 and the heel section 34 such that the main body section 28 axially extends farther toward the sealed media side of the radial lip seal 24.

The sealing lip body 14 has a radially outer section 44 defining an outer diameter 46 of the sealing lip body 14 that is engageable against the inner diameter 42 of the main body section 28 of the heelstock body 26. The radially outer section 44 has an axial edge 48 that is distally opposite the supporting section 30 of the heelstock body 26 and is radially adjacent an axial edge 50 of the main body section 28 of the heelstock body 26. The axial edge 48 of the sealing lip body 14 has a length that is less than the length of the axial edge 50 of the heelstock body 26. The radially outer section 44 extends axially from the axial edge 48 away from the sealed media side to the radially outer end point 40 along the inner diameter 42 of the main body section 28 of the heelstock body 26. A midsection 52 of the sealing lip body 14 extends radially inwardly from the radially outer section 44 along the supporting section 30 of the heelstock body 26. The midsection 52 extends to the flexible section 22 of the sealing lip body 14.

The sealing lip body 14 includes a head section 54 that is adjacent the flexible section 22 and includes the contact point 18 for the radial lip seal 24. The radially outer section 44, the midsection 52, the flexible section 22 and the head section 54 may all face each other to form a pocket and define the open-faced side of the radial lip seal 24 that faces the sealed media side. The head section 54 may be the only portion of the sealing lip body 14 that is exposed to outside the radial lip seal 24 in a radial direction. The main body portion 26 of the heelstock body 26 may extend axially farther toward the sealed media side than the head section 54 of the sealing lip body 14.

The heel section 34 of the heelstock body 26 may be radially inwardly relative to at least part of the flexible section 22 and extends axially along the flexible section 22 to the termination point 36. A portion of the heel section 34 may be curved radially inwardly to the termination point 36, and the heel section 34 may define a radially inner surface of the radial lip seal 24 adjacent the head section 54 of the sealing lip body 14. The termination point 36 may be arranged along the radially inner surface, and an airside surface 56 of the radial lip seal 24 may be defined between the termination point 36 and the contact point 18 of the sealing lip body 14. On the opposite side of the contact point 18, a scraping surface 58 may be formed such that the scraping surface 58 and the airside surface 56 meet at the contact point 18. The scraping surface 58 and the airside surface 56 may each be angled toward the contact point 18.

The airside surface 56 may be axially inclined from the termination point 36 toward the contact point 18, and the scraping surface 58 may be axially inclined from the contact point 18 to a midpoint 60 of the head section 54. The scraping surface 58 may be formed on the sealed media side of the radial lip seal 24. The scraping surface 58 is angled relative to the inner diameter, as defined by the contact point 18 of the radial lip seal 24. For example, the scraping surface 58 may have an angle between 35 and 55 degrees relative to the inner diameter. The airside surface 56 may also be angled relative to the inner diameter and have a shallower angled relative to the angle of the scraping surface 58. For example, the airside surface 56 may have an angle between 15 and 30 degrees relative to the inner diameter. The angles of the surfaces are used to determine the contact footprint of the lip on the rotary shaft 12. The surfaces may have other angles and arrangements, and the arrangement of the surfaces may be dependent on the application.

In an exemplary application, the radial lip seal 24 may be spring-energized for positive oil retention by a spring element 62. The spring element 62 may be provided to maintain a constant and uniform load of the contact point 18 of the sealing lip body 14 on the rotary shaft 12. A spring element may be able to keep the seal lip in contact with the rotary shaft 12 during higher shaft speeds and may also overcome for compression set and wear of the material of the sealing lip body 14. Any suitable spring element 62 may be used, such as a wound spring or garter spring. Other suitable springs include finger springs, cantilever springs, canted-coil springs, and helical springs. The spring may be formed of any suitable material, such as a metal material. A suitable metal material includes stainless steel. The selected spring may be dependent on the temperature of a particular application and the type of fluid used in the particular application. The head section 54 of the sealing lip body 14 may be configured to retain the spring element 62. A leading edge of the sealing lip body 14 is arranged to be toward the sealed media side of the radial lip seal 24, and a centerline of the spring element 62 may be slightly toward the airside, such as toward the airside surface 56. In other exemplary applications, the radial lip seal 24 may be springless.

Figure 3:
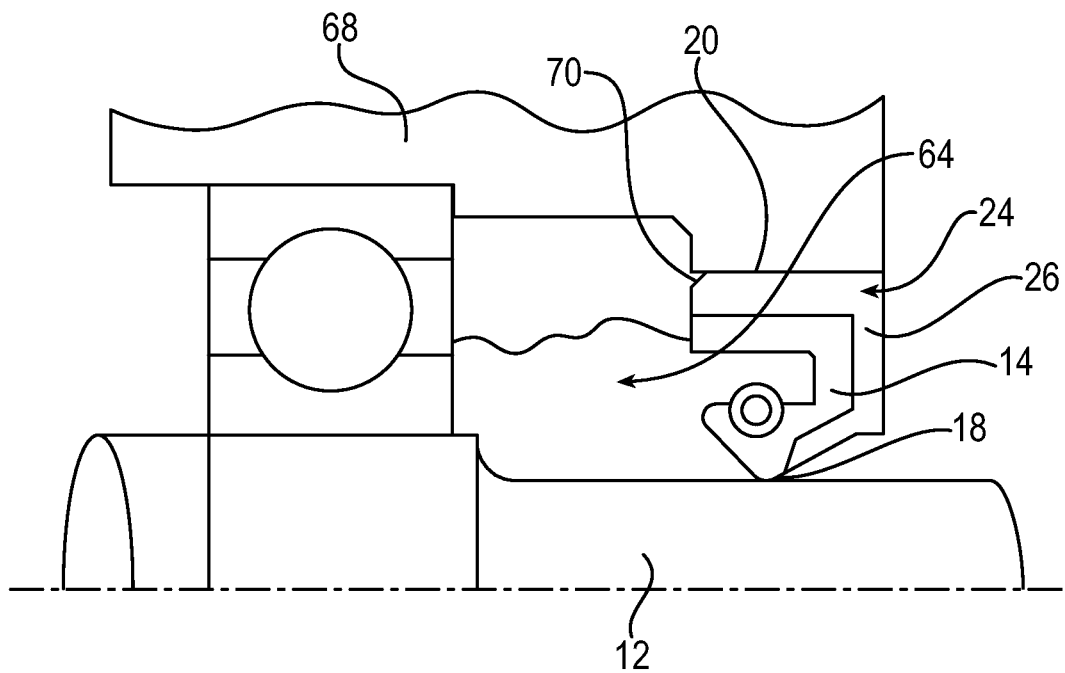
FIG. 3 is a drawing depicting an exemplary application of the radial lip seal of FIG. 2 in which the radial lip seal faces a lubricant.
Figure 4:
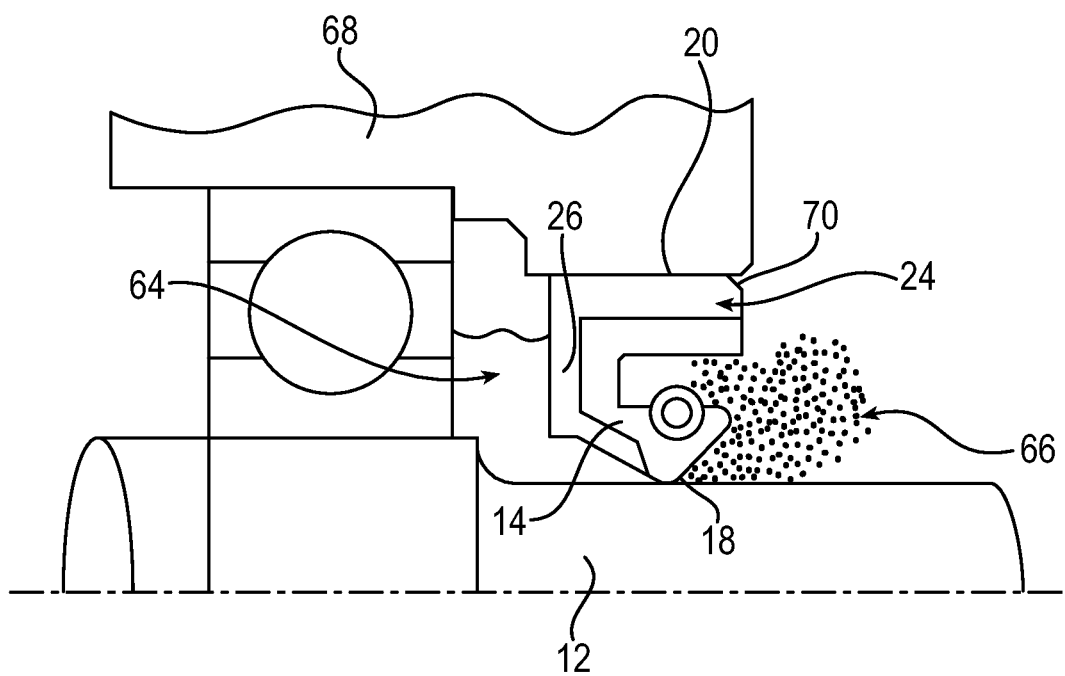
FIG. 4 is a drawing depicting an exemplary application of the radial lip seal of FIG. 2 in which the radial lip seal faces a contaminant.

Referring now to FIGS. 3 and 4, exemplary applications for the radial lip seal 24 are shown. Although one radial lip seal 24 is shown, more than one radial lip seal may be used in particular applications. The radial lip seal 24 may be used to retain lubricants within a sump or cavity, and/or to exclude contaminants from the system lubricant. In exemplary applications, the radial lip seal 24 may be used to separate two different fluids, retain internal pressure, or exclude an external pressure. During operation of the radial lip seal 24, a lubricant 64, or oil, is squeezed and maintained by the radial lip seal 24 in a thin layer between the lip or contact point 18 of the sealing lip body 14 and the rotary shaft 12. Oil is suitable as a lubricant for many applications, but other types of lubricants may also be suitable depending on a particular application. The radial lip seal 24 may also exclude outboard or contaminant material 66 that would contaminate the lubricant or directly damage the bearing. Exemplary contaminants include moisture, water, dust, sand, dirt, and other particulates.

The outer diameter 20 defined by the heelstock body 26 of the radial lip seal 24 may be larger than a seal housing 68 to ensure a press-fit and leak-free fit between the heelstock body 26 and the seal housing 68. The seal housing 68 is also secured to the rotary shaft 12 such that the radial lip seal 24 is interposed between the rotary shaft 12 and the seal housing 68. The outer diameter 20 of the heelstock body 26 may have a chamfered surface 70, as also shown in FIG. 2. As shown in comparing FIGS. 3 and 4, the orientation of the radial lip seal 24 may be dependent on the primary function of the radial lip seal 24. Although the radial lip seal 24 is suitable for performing both retention and exclusion functions, one function may be considered to be the primary function of the seal. If the primary function of the radial lip seal 24 is retention, the radial lip seal 24 may be arranged with the open-faced side facing toward the lubricant 64, as shown in FIG. 3. If the primary function of the radial lip seal 24 is to exclude, the open-faced side of the radial lip seal 24 may be arranged to face the outboard or contaminant material 66, as shown in FIG. 4. In exemplary embodiments in which both retention and exclusion are equally desirable, more than one radial lip seal may be provided.

Figure 5:
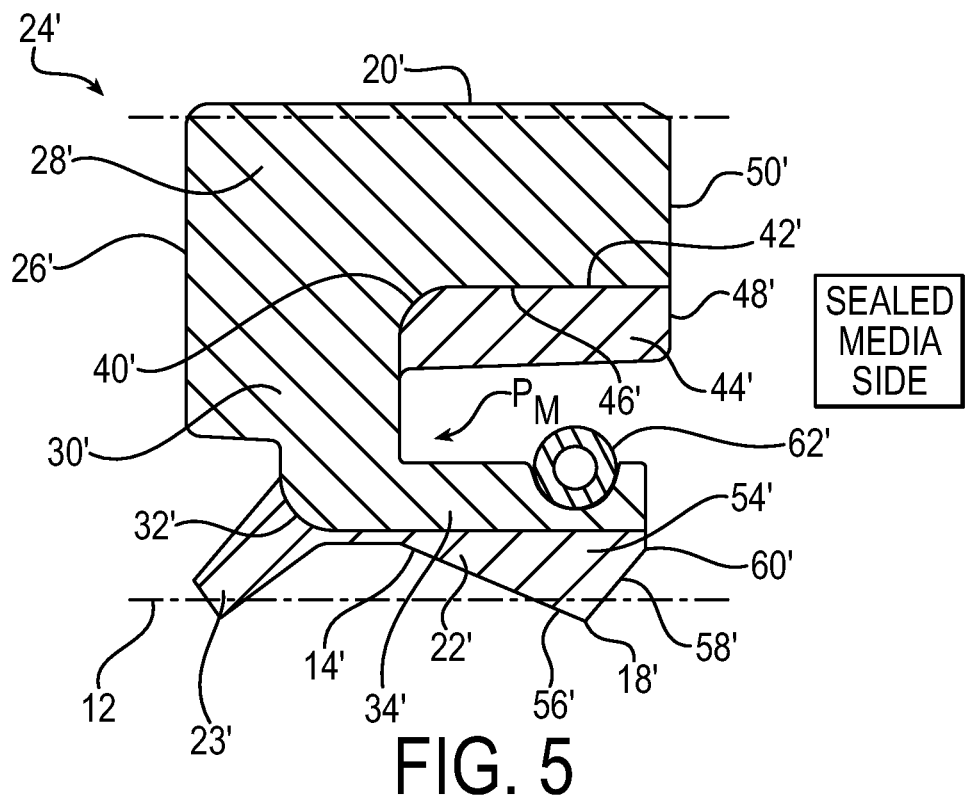
FIG. 5 is a drawing depicting a sectional view of a radial lip seal in accordance with another embodiment of the present application in which the sealing lip body has an excluder lip.
Figure 6:
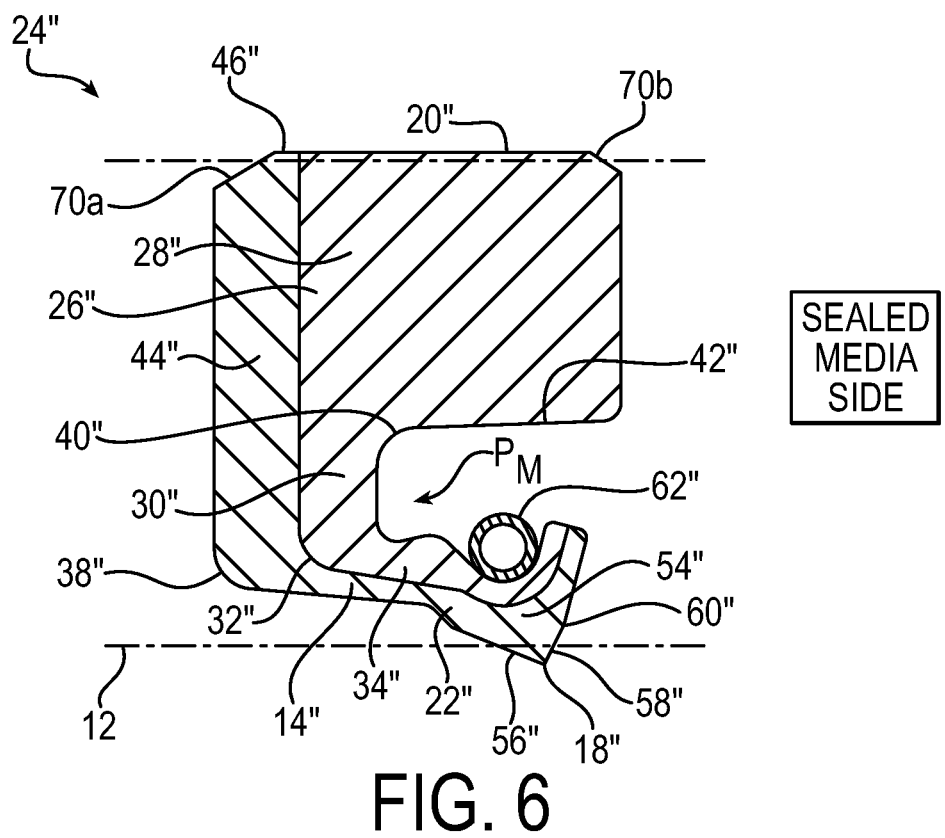
FIG. 6 is a drawing depicting a sectional view of a radial lip seal in accordance with still another embodiment of the present application in which the sealing lip body defines a heel of the radial lip seal.
Figure 7:
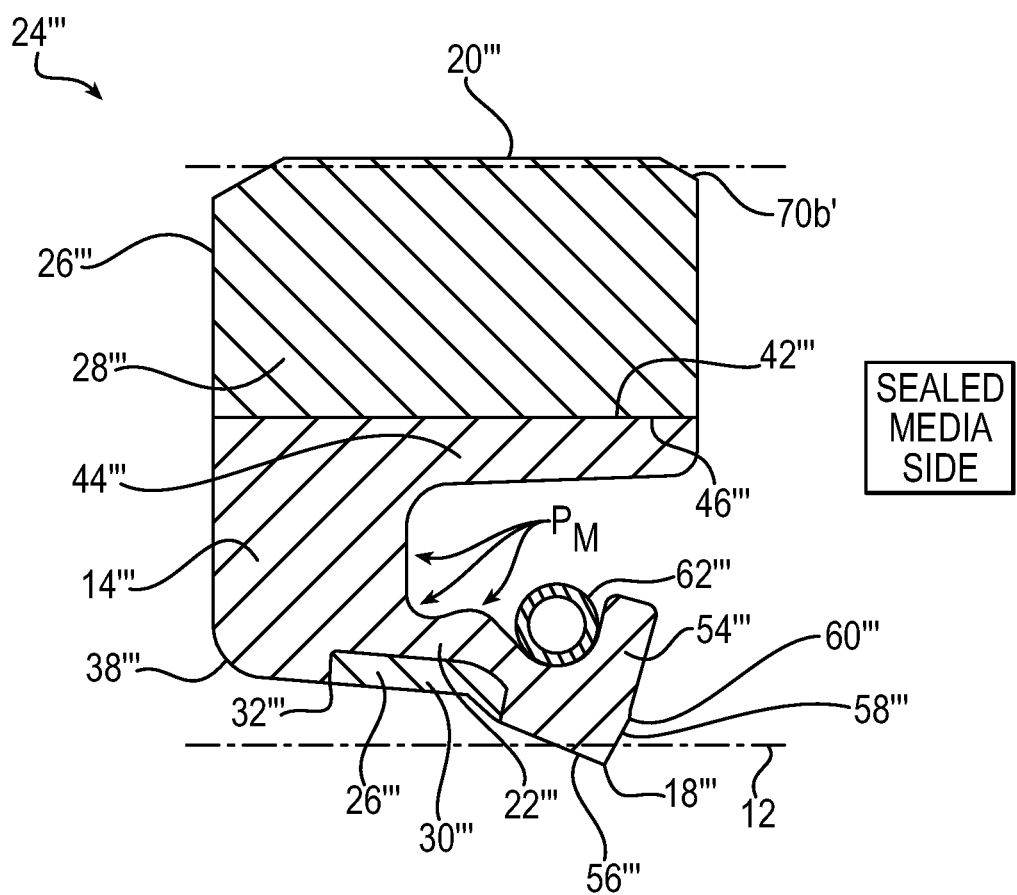
FIG. 7 is a drawing depicting a section view of a radial lip seal in accordance with still another embodiment of the present application in which the heelstock body has a main body portion and a supporting portion that are separately bonded to the sealing lip body.

Referring now to FIGS. 5-7, radial lip seals 24', 24'', 24''' in accordance with further embodiments of the present application are shown. The radial lip seals 24', 24'', 24''' include the heelstock body 26', 26'', 26''' being applied to a radially outer side, or top side, of the sealing lip body 14', 14'', 14'''. The heelstock materials and the sealing lip body materials may be similar to any of the materials previously described.

FIG. 5 shows the radial lip seal 24' having the sealing lip body 14' formed as a double lip with a secondary excluder lip 23' arranged axially spaced from and opposite the contact point 18'. The radial lip seal 24' is arranged around the rotary shaft 12 and has the sealing lip body 14' and the heelstock body 26'. The heelstock body 26' may be formed of a fiber material and elastomer composite. The heelstock body 26' is formed radially outwardly relative to the sealing lip body 14' such that the heelstock body 26' enables flexibility of the seal while also providing stiffness to the sealing lip body 14' for bore retention. The heelstock material of the heelstock body 26' may form more than half of a volume of the radial lip seal 24' as compared with the material of the sealing lip body 14'. The shape of the heelstock body 26' will be dependent on the application.

The heelstock body 26' has the main body section 28' that defines the outer diameter 20' of the radial lip seal 24' and the supporting section 30' that extends from the main body section 28' to the heel point 32' of the heelstock body 26'. The main body section 28' may jut axially outwardly from the supporting section 30' in a direction away from the sealed media side of the radial lip seal 24'. The secondary excluder lip 23' of the sealing lip body 14' extends outwardly from the heel point 32' and provides another contact point with the rotary shaft 12. The secondary excluder lip 23' is formed axially adjacent the flexible section 22' of the sealing lip body 14' and is continuous with the flexible section 22' such that the sealing lip body 14' is formed as a unitary body having the contact point 18' and the secondary excluder lip 23'.

The heel point 32' may be curved such that the angle of curvature of the heel point 32' is greater than 90 degrees. The supporting section 30' of the heelstock body 26' may extend radially inwardly toward the inner diameter of the radial lip seal 24', as defined by the contact point 18' and the secondary excluder lip 23' of the sealing lip body 14'. The heel section 34' of the heelstock body 26' extends axially from the heel point 32' toward the contact point 18', and may extend past the contact point 18' to define an axial edge of the radial lip seal 24'. The heelstock body 26' is formed to extend along the flexible section 22' of the sealing lip body 14' from the secondary excluder lip 23' toward the contact point 18'.

The heelstock body 26' may curve around the radially outer end point 40' of the sealing lip body 14' that is radially spaced from the flexible section 22'. The main body section 28' of the heelstock body 26' has an inner diameter 42' opposing the outer diameter 20', and the inner diameter 42' may curve around the radially outer end point 40' of the sealing lip body 14' to the supporting section 30' of the heelstock body 26'. The supporting section 30' then extends radially inwardly toward the heel point 32' until the supporting section 30' curves to the heel section 34' of the heelstock body 26'. The sealing lip body 14' may be configured to extend along the length of the heel section 34' such that the underside of the radial lip seal 24' is defined by the sealing lip body 14'.

The sealing lip body 14' has the radially outer section 44' defining the outer diameter 46' of the sealing lip body 14' that is engageable against the inner diameter 42' of the main body section 28' of the heelstock body 26'. The radially outer section 44' has an axial edge 48' that is radially adjacent the axial edge 50' of the main body section 28' of the heelstock body 26'. The radially outer section 44' extends axially from the axial edge 48' away from the sealed media side to the radially outer end point 40' along the inner diameter 42' of the main body section 28' of the heelstock body 26'. The supporting section 30', the heel section 34', and the radially outer section 44' of the sealing lip body 14' are configured to form a pocket of the radial lip seal 24' and receive the system pressure $P_M$, which may be a medium pressure between 8 and 30 psi. The sections may face each other to form the pocket and define the open-faced side of the radial lip seal 24' that faces the sealed media side.

The sealing lip body 14' includes the head section 54' that is adjacent the flexible section 22' and includes the contact point 18' for the radial lip seal 24'. The head section 54' and the secondary excluder lip 23' may be exposed to outside the radial lip seal 24' in a radial direction. The airside surface 56' of the radial lip seal 24' may be defined on one side of the contact point 18' of the sealing lip body 14'. On the opposite side of the contact point 18', the scraping surface 58' may be formed such that the scraping surface 58' and the airside surface 56' meet at the contact point 18'. The scraping surface 58' and the airside surface 56' may each be angled toward the contact point 18'. The airside surface 56' may be axially inclined toward the contact point 18', and the scraping surface 58' may be axially inclined from the contact point 18' to the midpoint 60' of the head section 54'. The scraping surface 58' may be formed on the sealed media side of the radial lip seal 24'.

In an exemplary application, the radial lip seal 24' may be spring-energized for positive oil retention by the spring element 62'. In an exemplary embodiment, the spring element 62' may be a garter spring. The spring element 62' may be supported by the heel section 34' of the heelstock body 26' and the spring element 62' may be supported by the heelstock body 26' above the head section 54' of the sealing lip body 14'. In other exemplary applications, the radial lip seal 24' may be springless.

FIG. 6 shows another configuration of the radial lip seal 24" in which the sealing lip body 14" extends around a perimeter, or outer boundary, of the heelstock body 26". The radial lip seal 24" is arranged around the rotary shaft 12, and the sealing lip body 14" and the heelstock body 26" are formed of the materials previously described. The heelstock body 26" has the main body section 28" that defines at least part of the outer diameter 20" of the radial lip seal 24" and the supporting section 30" that extends from the main body section 28" to the heel point 32" of the heelstock body 26". The heel point 32" may be curved such that the angle of curvature of the heel point 32" is greater than 90 degrees. The supporting section 30" may extend radially inwardly toward the inner diameter of the radial lip seal 24", as defined by the contact point 18" of the sealing lip body 14". The heel section 34" of the heelstock body 26" extends axially from the heel point 32" toward the contact point 18" along the flexible section 22" of the sealing lip body 14". The heelstock body 26" is formed to extend along an axially inner boundary of the sealing lip body 14" and forms a pocket that is configured to receive the system pressure $P_M$, which may be a medium pressure between 8 and 30 psi. The heelstock material of the heelstock body 26" may form more than half of a volume of the radial lip seal 24" as compared with the material of the sealing lip body 14" and the heelstock body 26" may extend along more than half of the axially inner boundary of the sealing lip body 14". The heelstock body 26" may extend along an entire length of the inner boundary of the sealing lip body 14". The outer boundary of the sealing lip body 14" may be exposed to outside the radial lip seal 24".

The main body section 28" of the heelstock body 26" has the inner diameter 42" opposing the outer diameter 20", and the inner diameter 42" may curve around a radial end point 40" of the heelstock body 26" to the supporting section 30". The supporting section 30" then extends radially inwardly toward the heel point 32" until the supporting section 30" curves around the heel point 32" to the heel section 34". The sealing lip body 14" has the radially outer section 44" defining the outer diameter 46" of the sealing lip body 14" that is axially aligned with the outer diameter 20" of the heelstock body 26" to form the entire outer diameter of the radial lip seal 24". The radially outer section 44" extends radially inwardly from the outer diameter 46" toward the heel point 38" and along the main body section 28" and the supporting section 30" of the heelstock body 26".

Each of the radially outer section 44" and the main body section 28" may have a chamfered edge 70*a*, 70*b* and the chamfered edges 70*a*, 70*b* may be angled relative to each other and arranged on opposite axial ends of the radial lip seal 24". The flexible section 22" of the sealing lip body 14" extends axially from the heel point 38" of the sealing lip body 14" toward the contact point 18" such that the sealing lip body 14" may surround the heelstock body 26". The heel point 38" of the sealing lip body 14" may define the heel of the radial lip seal 24".

The sealing lip body 14" includes the head section 54" that is adjacent the flexible section 22" and includes the contact point 18" for the radial lip seal 24".

The sealing lip body 14" may be formed as a continuous body that includes the radially outer section 44", the flexible section 22", and the head section 54". The inner diameter 42", the supporting section 30", and the heel section 34" of the heelstock body 26" may face each other to form the pocket and define the open-faced side of the radial lip seal 24" that faces the sealed media side. The airside surface 56" of the radial lip seal 24" may be defined on one side of the contact point 18" of the sealing lip body 14". On the opposite side of the contact point 18", the scraping surface 58" may be formed such that the scraping surface 58" and the airside surface 56" meet at the contact point 18". The scraping surface 58" and the airside surface 56" may each be angled toward the contact point 18". The airside surface 56" may be axially inclined toward the contact point 18", and the scraping surface 58" may be axially inclined from the contact point 18" to a midpoint 60" of the head section 54". The scraping surface 58" may be formed on the sealed media side of the radial lip seal 24".

In an exemplary application, the radial lip seal 24" may be spring-energized for positive oil retention by the spring element 62". In an exemplary embodiment, the spring element 62" may be a garter spring. The spring element 62" may be supported by the heel section 34" of the heelstock body 26" and the spring element 62" may be supported by the heelstock body 26" above the head section 54" of the sealing lip body 14". The spring element 62" may be supported by the heel section 34" of the heelstock body 26". In other exemplary applications, the radial lip seal 24" may be springless.

FIG. 7 shows another configuration of the radial lip seal 24''' in which the sealing lip body 14''' is bonded to radially separated portions of the heelstock body 26'''. The radial lip seal 24''' is arranged around the rotary shaft 12 and the sealing lip body 14''' and the heelstock body 26''' are formed of the materials previously described. The heelstock body 26''' has the main body section 28''' that defines the outer diameter 20''' of the radial seal lip 24'''.

The heel stock portion 26''' includes a supporting section 30''' that is radially spaced and separated relative to the main body section 28''' and extends axially from a first point 32''' toward the contact point 18''' of the sealing lip body 14''' along the flexible section 22''' of the sealing lip body 14'''. Arranging a separate supporting section 30''' of the heelstock body 26''' is advantageous in providing further structural support for the radial lip seal 24''' as compared with conventional radial lip seals in which the heelstock body is only arranged radially outwardly relative to the sealing lip body. The heelstock body 26''' is formed to at least partly define an axially inner boundary of the radial seal lip 24''' along with the sealing lip body 14'''. The heel stock portion 26''' may be at least partly surrounded by the sealing lip body 14'''. The main body section 28''' may have chamfered edges 70*b'* and the chamfered edges 70b' may be angled relative to each other and arranged on opposite axial ends of the radial lip seal 24'''.

The heelstock body 26''' may form around half of a volume of the radial lip seal 24''' as compared with the material of the sealing lip body 14'''. The main body section 28''' has the inner diameter 42''' opposing the outer diameter 20''' and the inner diameter 42''' may extend parallel with the outer diameter 20'''. The sealing lip body 14''' has the radially outer section 44''' defining the outer diameter 46''' of the sealing lip body 14''' that is engaged against the inner diameter 42''' of the heelstock body 26'''. The radially outer section 44''' extends radially inwardly from the outer diameter 46''', away from the main body section 28''' of the heelstock body 26''' towards the heel point 38''' that defines the heel of the radial seal lip 24'''. The flexible section 22''' of the sealing lip body 14''' extends axially from the heel point 38''' toward the contact point 18''' and over the supporting section 30''' of the heelstock body 26'''. The supporting section 30''' may be inserted within the sealing lip body 14''' such that the inner radial perimeter of the radial lip seal 24''' is continuous from the heel point 38''' to the contact point 18'''.

The sealing lip body 14''' further includes the head section 54''' that is adjacent the flexible section 22''' and includes the contact point 18''' for the radial lip seal 24'''. The sealing lip body 14''' is formed as a continuous body that includes the radially outer section 44''', the flexible section 22''', and the head section 54'''. The radially outer section 44''' may face the flexible section 22''' and the head section 54''' to form the pocket and define the open-faced side of the radial lip seal 24''' that faces the sealed media side. The pocket is configured to receive the system pressure $P_M$, which may be a medium pressure between 8 and 30 psi.

The airside surface 56''' of the radial lip seal 24''' may be defined on one side of the contact point 18''' of the sealing lip body 14'''. On the opposite side of the contact point 18''', the scraping surface 58''' may be formed such that the scraping surface 58''' and the airside surface 56''' meet at the contact point 18'''. The scraping surface 58''' and the airside surface 56''' may each be angled toward the contact point 18'''. The airside surface 56''' may be axially inclined toward the contact point 18''', and the scraping surface 58''' may be axially inclined from the contact point 18''' to a midpoint 60''' of the head section 54'''. The supporting section 30''' of the heelstock body 26''' may be bent radially inwardly such that the airside surface 56''' is inclined from a contact surface with the supporting section 30''' to the contact point 18'''. The scraping surface 58''' may be formed on the sealed media side of the radial lip seal 24'''.

In an exemplary application, the radial lip seal 24''' may be spring-energized for positive oil retention by the spring element 62'''. In an exemplary embodiment, the spring element 62''' may be a garter spring. The spring element 62''' may be supported by the head section 54''' of the sealing lip body 14'''. In other exemplary applications, the radial lip seal 24''' may be springless. The radial lip seal 24, 24',24",24''' described herein may have sealing lip bodies and/or heelstock bodies with many different configurations or shapes that are dependent on the application. Any configuration may include a single lip or double lip and the heelstock body may be arranged on a top side of the lip body along a radially outer boundary of the lip body, or on the bottom side along a radially inner boundary of the lip body.

A radial lip seal includes a sealing lip body having a contact point defining an inner diameter of the radial lip seal, and a heelstock body defining an outer diameter and having a supporting section that is arranged radially inwardly relative to the outer diameter and extends along a boundary of the sealing lip body toward the contact point. The heelstock body is formed of a heelstock material that is flexible, and the heelstock material is stiffer relative to a material of the sealing lip body.

The heelstock material may be formed of a non-metal material.

The heelstock material may be formed of a fiber material and elastomer composite.

The fiber material may be an aramid fiber material.

The material of the sealing lip body is an elastomeric material.

The material of the sealing lip body may be formed of a fluoroelastomer, nitrile or ethylene propylene diene terpolymer.

Each of the heelstock body and the sealing lip body may be formed as a continuous body.

The sealing lip body and the heelstock body may be bonded to each other.

The heelstock material may form more than half of a volume of the radial lip seal.

The supporting section of the heelstock body may curve along the sealing lip body at two different points located along the boundary of the sealing lip body.

At least one of the heelstock body and the sealing lip body may form a pocket that is configured to receive a pressure ranging between 8 and 30 psi.

The sealing lip body may include a flexible section and a head section that is axially adjacent the flexible section and defines the contact point, with the head section being exposed to outside the radial lip seal in a radial direction.

The heelstock body may extend along a radially inner side of the flexible section.

The heelstock body may define an outer heel point of the radial lip seal.

The heelstock body may extend along a radially outer side of the flexible section.

The heelstock body may define an outer heel point of the radial lip seal.

The heelstock body may include a main body section, a heel point, and a heel section, wherein the supporting section extends radially inwardly from the main body section to the heel point of the heelstock body, and wherein the heel section extends axially from the heel point along the flexible section of the sealing lip body.

The sealing lip body may be a double lip having a secondary excluder that is axially spaced relative to the contact point.

The radial lip seal may be spring-loaded by a spring supported in one of the heelstock body or the sealing lip body.

The sealing lip body may have an air side surface defined on a first side of the contact point, and a scraping surface that is arranged opposite the contact point relative to the air side surface.

A method of forming a radial lip seal includes forming a sealing lip body having a contact point defining an inner diameter of the radial lip seal, forming a heelstock body defining an outer diameter and having a supporting section extending radially inwardly from the outer diameter toward the contact point, forming the heelstock body of a heelstock material that is flexible and stiffer relative to a material of the sealing lip body, and bonding the heelstock body and the sealing lip body, wherein the heelstock body extends along a boundary of the sealing lip body.

The method may include forming the heelstock material of a non-metal material, and forming the sealing lip body of an elastomer material.

The method may include forming the heelstock material of a fiber material and elastomer composite.

The method may include forming the heelstock material of an aramid fiber material.

The method may include forming each of the heelstock body and the sealing lip body as a continuous body, and engaging most of the boundary of the sealing lip body with the heelstock body.

The method may include arranging a spring in the radial lip seal.

The method may include forming the sealing lip body to have a head section which defines the contact point is exposed to outside the radial lip seal in a radial direction.

The method may include forming more than half of a volume of the radial lip seal of the heelstock material.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A radial lip seal comprising:
   a sealing lip body having a contact point defining an inner diameter of the radial lip seal, and
   a heelstock body comprising a main body and a supporting section,
   wherein the radial lip seal has a radially outer section comprising an axial edge of the main body and an axial edge of the sealing lip body, wherein the axial edge of the main body and the axial edge of the sealing lip body form a flush axial edge that is distally opposite the supporting section;
   the heelstock body defining an outermost diameter of the radial lip seal and having the supporting section that is arranged radially inwardly relative to the outermost diameter and extends along a boundary of the sealing lip body toward the contact point,
   wherein the heelstock body is formed of a heelstock material that is flexible, and the heelstock material is stiffer relative to a material of the sealing lip body, and
   wherein the heelstock material is formed of only non-metal material.

2. The radial lip seal according to claim 1, wherein the heelstock material is formed of a fiber material and elastomer composite.

3. The radial lip seal according to claim 1, wherein the material of the sealing lip body is an elastomeric material.

4. The radial lip seal according to claim 3, wherein the material of the sealing lip body is formed of a fluoroelastomer, nitrile or ethylene propylene diene terpolymer.

5. The radial lip seal according to claim 1, wherein the sealing lip body is formed as a continuous body.

6. The radial lip seal according to claim 1, wherein the sealing lip body and the heelstock body are bonded to each other.

7. The radial lip seal according to claim 1, wherein the heelstock material forms more than half of a volume of the radial lip seal.

8. The radial lip seal according to claim 1, wherein the supporting section of the heelstock body curves along the sealing lip body at two different points located along the boundary of the sealing lip body.

9. The radial lip seal according to claim 1, wherein at least one of the heelstock body and the sealing lip body forms a pocket that is configured to receive a pressure ranging between 8 and 30 psi.

10. The radial lip seal according to claim 1, wherein the sealing lip body includes a flexible section and a head section that is axially adjacent the flexible section and defines the contact point, the head section being exposed to outside the radial lip seal in a radial direction.

11. The radial lip seal according to claim 10, wherein the heelstock body extends along a radially inner side of the flexible section.

12. The radial lip seal according to claim 11, wherein the heelstock body defines an outer heel point of the radial lip seal.

13. The radial lip seal according to claim 10, wherein the heelstock body extends along a radially outer side of the flexible section.

14. The radial lip seal according to claim 13, wherein the heelstock body defines an outer heel point of the radial lip seal.

15. The radial lip seal according to claim 10, wherein the heelstock body includes a main body section, a heel point, and a heel section, wherein the supporting section extends radially inwardly from the main body section to the heel point of the heelstock body, and wherein the heel section extends axially from the heel point along the flexible section of the sealing lip body.

16. The radial lip seal according to claim 10, wherein the sealing lip body is a double lip having a secondary excluder that is axially spaced relative to the contact point.

17. The radial lip seal according to claim 10, wherein the radial lip seal is spring-loaded by a spring supported in one of the heelstock body or the sealing lip body.

18. The radial lip seal according to claim 10, wherein the sealing lip body has an air side surface defined on a first side of the contact point, and a scraping surface that is arranged opposite the contact point relative to the air side surface.

19. A method of forming a radial lip seal comprising:
   forming a sealing lip body having a contact point defining an inner diameter of the radial lip seal and a heelstock body comprising a main body and a supporting section, wherein the radial lip seal has a radially outer section comprising an axial edge of the main body and an axial edge of the sealing lip body, wherein the axial edge of the main body and the axial edge of the sealing lip body form a flush axial edge that is distally opposite the supporting section;
   forming the heelstock body defining an outermost diameter of the radial lip seal and having the supporting section arranged radially inwardly relative to the outermost diameter;

forming the heelstock body of a heelstock material that is flexible and stiffer relative to a material of the sealing lip body, wherein the heelstock material is formed of only non-metal material; and bonding the heelstock body and the sealing lip body, wherein the heelstock body extends along a boundary of the sealing lip body toward the contact point.

\* \* \* \* \*